(12) United States Patent
Ebbitt

(10) Patent No.: US 6,648,100 B2
(45) Date of Patent: Nov. 18, 2003

(54) METHOD OF TUNING ACOUSTICAL ABSORPTION IN A VEHICLE INTERIOR

(75) Inventor: Gordon L. Ebbitt, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/103,361

(22) Filed: Mar. 21, 2002

(65) Prior Publication Data

US 2003/0075383 A1 Apr. 24, 2003

Related U.S. Application Data

(60) Provisional application No. 60/334,998, filed on Oct. 24, 2001.

(51) Int. Cl.$^7$ .............................. E04B 1/82; G10K 11/00; B60R 13/08
(52) U.S. Cl. .................... 181/293; 181/296; 181/286
(58) Field of Search ................................. 181/210, 293, 181/296, 284, 286, 204, 205, 292, 175

(56) References Cited

U.S. PATENT DOCUMENTS

| | | | | |
|---|---|---|---|---|
| 2,962,385 A | * | 11/1960 | Rees et al. .................. | 181/296 |
| 3,013,937 A | * | 12/1961 | Brown et al. ............... | 181/296 |
| 4,056,161 A | * | 11/1977 | Allen, Jr. .................... | 181/290 |
| 4,097,633 A | | 6/1978 | Focht | |
| 5,539,182 A | * | 7/1996 | Meurer .................. | 219/121.71 |
| 5,626,386 A | * | 5/1997 | Lush ...................... | 297/180.13 |
| 5,669,670 A | * | 9/1997 | Haraguchi et al. ..... | 297/452.61 |
| 5,700,052 A | | 12/1997 | Yamazaki et al. | |
| 5,744,763 A | | 4/1998 | Iwasa et al. | |
| 5,887,452 A | * | 3/1999 | Smith et al. .................. | 66/170 |
| RE36,323 E | | 10/1999 | Thompson et al. | |
| 5,962,107 A | | 10/1999 | Lowery et al. | |
| 6,003,950 A | * | 12/1999 | Larsson .................. | 297/452.42 |
| 6,082,489 A | * | 7/2000 | Iwao et al. .................. | 181/286 |
| 6,102,465 A | | 8/2000 | Nemoto et al. | |
| 6,131,454 A | * | 10/2000 | Kopp et al. .................... | 73/457 |
| 6,167,985 B1 | | 1/2001 | Van Ligten | |
| 6,220,388 B1 | | 4/2001 | Sanborn | |
| 6,246,953 B1 | * | 6/2001 | Quinn et al. ................. | 701/111 |
| 6,248,423 B1 | | 6/2001 | Clarke et al. | |
| 6,260,660 B1 | | 7/2001 | Yoerkie, Jr. et al. | |
| 6,267,838 B1 | | 7/2001 | Saugnac et al. | |
| 6,273,810 B1 | * | 8/2001 | Rhodes et al. ......... | 297/180.13 |
| 6,290,022 B1 | | 9/2001 | Wolf et al. | |
| 6,296,076 B1 | | 10/2001 | Hiers et al. | |
| 6,345,688 B1 | | 2/2002 | Veen et al. | |

FOREIGN PATENT DOCUMENTS

| | | |
|---|---|---|
| EP | 0849137 | 6/1998 |
| JP | 62187947 A * | 8/1987 |
| JP | 08275841 A * | 10/1995 |

OTHER PUBLICATIONS

Chen, Pusheng; Ebbitt, Gordon; Title: Noise absorption of automotive seats (1998); Source: Human Factors in Driving, Vehicle Seating, and Rear Vision SAE Special Publications v 1358 Feb 1998. SAE, Warrendale, PA, USA. pp. 117–121 980659.*

* cited by examiner

Primary Examiner—Robert E. Nappi
Assistant Examiner—Eduardo Colon-Santana
(74) Attorney, Agent, or Firm—Bill C. Panagos

(57) ABSTRACT

A vehicle seat cover is designed to facilitate acoustic energy absorption by forming in the cover an optimal size and arrangement of perforations based on at target noise frequency range, the perforations allowing the noise to pass through the cover into the interior structure of the seat where the acoustic energy is dissipated in the form of heat.

2 Claims, 5 Drawing Sheets

METHOD OF TUNING ACOUSTICAL ABSORPTION IN A VEHICLE INTERIOR

CROSS-REFERENCE TO RELATED APPLICATIONS

This application claims the benefit of U.S. provisional application Serial No. 60/334,998 filed Oct. 24, 2001.

BACKGROUND OF THE INVENTION

1. Field of the Invention

The present invention relates to a method of absorbing noise in a vehicle interior, and in particular to providing a seat cover with perforations optimized to facilitate noise absorption over a given range of frequencies.

2. Background Art

Noise in the interior of a vehicle is undesirable, and its reduction or elimination has long been a goal of vehicle interior designers. A variety of methods exist to try to achieve this goal. Since it is well known that porous materials are generally good absorbers of sound, vehicle interior components are often covered with porous materials to help quiet the vehicle's interior. Carpeting is used on the floor and headliners are installed on the roof. Typically, thick porous materials faced with an open weave absorb sound better than thinner materials with impermeable faces. Often however, it is impractical to use thick materials in the interior of a vehicle, since interior space is limited. Moreover, a material with an open weave may lack other important functional characteristics such as high wear resistance. Hence, using thick, loosely woven carpets and headliners with open faces is not an adequate solution to the problem of vehicle interior noise.

One attempt to reduce engine noise before it reaches the vehicle interior is described in U.S. Pat. No. 5,744,763 issued to Iwasa et al. on Apr. 28, 1998. Iwasa et al. describes a sound absorbing material comprising a pulverized rubber layer and a covering layer. The sound absorbing material of Iwasa et al. is used on the inside of a vehicle hood panel, where noise waves from the engine pass through the covering material and are partially absorbed by the pulverized rubber. The material described in Iwasa et al. is designed for use in the engine compartment, and is specifically targeted to engine noise. Thus other noises external to the vehicle, such as road noise, are not reduced. Moreover, the pulverized rubber material necessarily adds bulk to the sound absorbing material, making it impractical for use in the interior of a vehicle.

Because the problem of noise in the interior of a vehicle cannot be eliminated by merely providing a sound absorbing material in the engine compartment, nor by altering the materials from which the carpet and headliner are made, other interior components have been analyzed for possible noise reduction improvements. For example, it is not uncommon for interior trim components to be made from, or at least covered with, a material that absorbs acoustic energy. Trim components on doors and package trays are two examples of interior components on which designers have focused their attention to try to reduce the noise problem. These efforts have met with limited success, and the problem of interior noise remains.

Another area of focus in the search to eliminate vehicle interior noise is the occupant seats, and in particular, the materials used to cover the seats. For purposes of absorbing noise, a thick, loosely woven cloth material is highly effective. Unfortunately, both aesthetics and functionality discourage the use of such a material. Moreover, even if a suitable cloth material is found, many designers prefer to use leather, particularly in higher-end vehicles.

Accordingly, it is desirable to provide a method of tuning the acoustical absorption in a vehicle interior that overcomes the shortcomings of the prior art, by taking advantage of the large surface area of the vehicle seats to reduce the noise from various sources while not using bulky and potentially expensive materials on the interior of the vehicle.

SUMMARY OF THE INVENTION

The design challenge overcome by the present invention is this: how to take advantage of the large surface area of the seats—an excellent target for improving overall interior acoustic energy absorption—while still maintaining the comfort and aesthetic benefits of leather or other non-cloth seat covers. Accordingly, it is desirable to provide a method of utilizing leather or other non-cloth seat covers to facilitate the absorption of noise in the interior of a vehicle, thereby taking advantage of the large surface area presented by the seats, while not sacrificing the comfort or aesthetic quality of the cover material.

The present invention provides a method of absorbing noise in the interior of a vehicle by creating a non-cloth covering for the seats which is capable of facilitating sound absorption. First, a specific noise frequency range is targeted. This frequency range is based on a number of factors including elimination of engine noise and maintaining an environment conducive to intelligible speech. Engines can generate low frequency noise of a few hundred Hertz, as well as higher frequency noise in the range of a few thousand Hertz. In addition, noises from the wind and other sources external to the vehicle contribute to these higher frequency noises. This is particularly annoying to passengers since many of these higher frequency noises make it difficult to understand spoken words. The frequency range targeted by the present invention is broad enough to encompass most of these noises; however, some of the lowest frequency performance may be sacrificed (if desired) to increase the range of frequencies absorbed.

Once the targeted frequency range is determined, perforations are formed in the seat cover material. The use of perforations in seat covers is common for purposes of increasing breathability. However, it was discovered that these same perforations have a positive impact on noise absorption in the interior of the vehicle. In the present invention, the seat cover perforations are specifically made at an optimal size and with an optimal arrangement for the targeted frequency range. The optimizing is based on a predetermined relationship between percent open area and absorption frequency. The percent open area is affected by two parameters: perforation size and perforation density. In general, increasing the percent open area increases the range of frequencies over which good sound absorption occurs; however, varying the size of the perforations for any given percent open area, also affects this range. Optimizing the noise absorption requires knowledge and application of each of these relationships.

Once the frequency range is chosen and the optimum size and arrangement are determined, the seat cover material is processed in a perforation machine. The machine, which essentially consists of large spike-laden rollers, receives the various pieces of material which comprise the seat cover. After processing in the perforation machine, the pieces are sewn together to form the finished seat cover which is then placed over a seat. The holes in the seat cover allow noise to pass into the interior structure of the seat where the acoustic energy is dissipated in the form of heat. Hence, the process requires very little added labor cost, and because there are no bulky sound absorbing materials added to the interior of the vehicle, there is no added material cost and no added weight. The benefit to cost ratio is accordingly high.

The process can be used to optimize only the seat cover, or it can be part of an overall acoustic energy management system within the vehicle interior. When used in the latter application, the noise reduction resulting from the optimized seat cover is analyzed first. Then other interior components are similarly analyzed. With this information, the designer determines an overall desired acoustic energy absorption level. Because the optimized seat cover provides an inexpensive method of absorbing acoustic energy, other interior components can be redesigned to eliminate costly sound absorbing materials. This results in a no net loss or even a net gain in sound absorption within the vehicle interior, while significantly reducing overall costs.

Accordingly, one aspect of the invention provides a process for reducing noise in the interior of a vehicle, while not significantly increasing costs or the weight of the vehicle.

Another aspect of the invention provides a process for optimizing the acoustic energy absorption within a vehicle interior, by inexpensively increasing the sound absorbing capability of the seats and simultaneously reducing the sound absorbing capability of other interior components by eliminating costly sound absorbing material from the other components.

A further aspect of the present invention provides a process for tuning acoustical energy absorption of a vehicle interior by determining a target noise frequency range to be absorbed, providing a cover material to cover the vehicle seats, selecting an optimal arrangement and size of perforations in the cover and forming them therein, and then covering the vehicle seats with this cover after the perforations are formed. This optimization process provides the additional advantage of employing perforations which are not visible to the naked eye, thereby ensuring that the aesthetics of the vehicle interior are not adversely affected. This innovation is contrary to the teaching of conventional seat engineering that holds that sound absorbing perforations cannot be used in seat covers because they detract from the aesthetics of the vehicle interior.

The above aspects and other aspects, objects, features and advantages of the invention are readily apparent from the following detailed description of the best modes for carrying out the invention when taken in connection with the accompanying drawings.

DETAILED DESCRIPTION OF THE PREFERRED EMBODIMENT(S)

Figure 1:
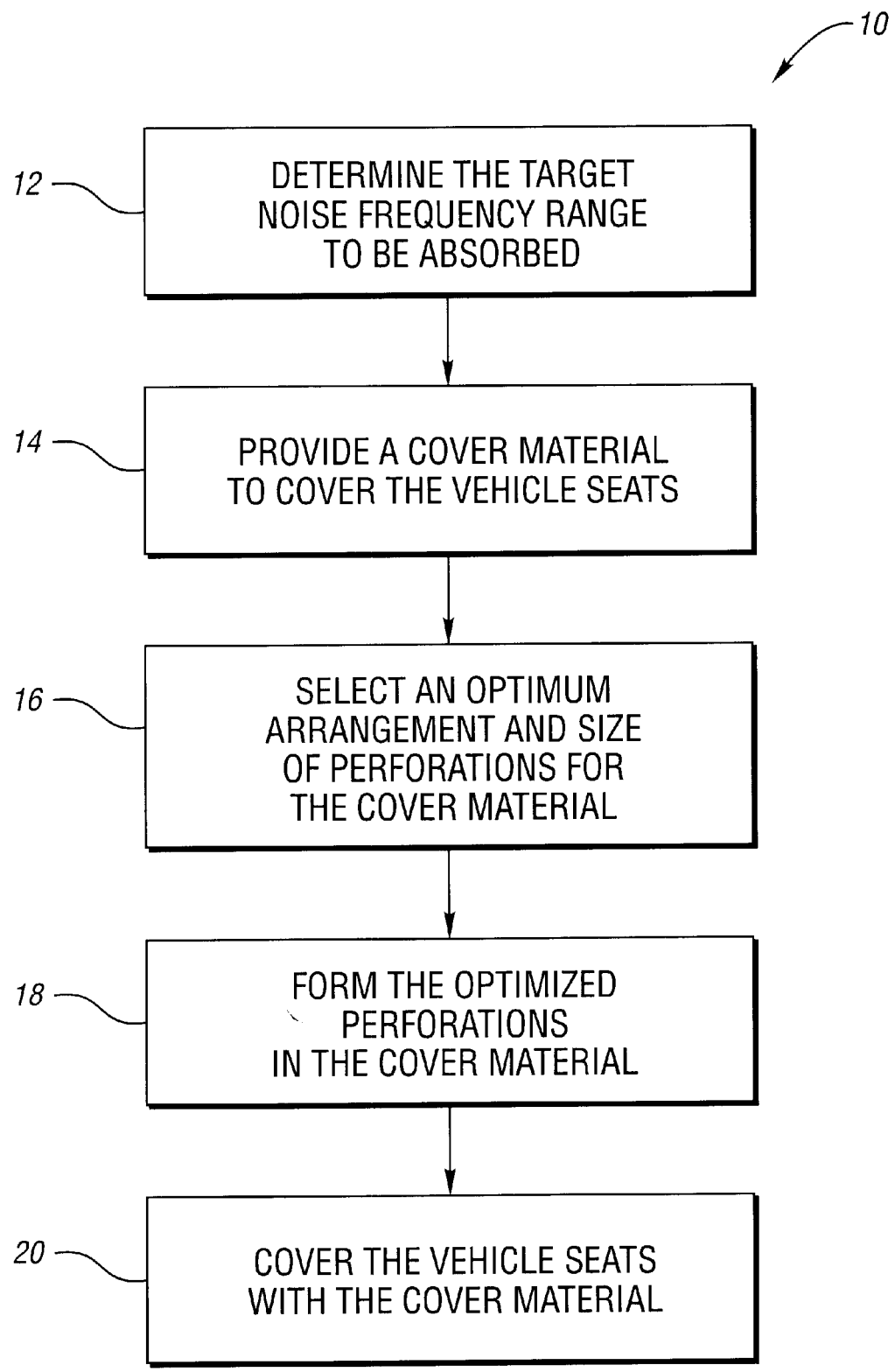
FIG. 1 is a flow chart illustrating the steps in accordance with an embodiment of the present invention.

The steps involved in executing the preferred embodiment process are illustrated in the flow chart shown in FIG. 1. The process 10 includes five distinct steps. First, represented in block 12, the target noise frequency range is determined. This is necessary since different vehicle interiors have different noise frequencies. The target noise frequency range is typically determined by performing a number of tests. First, an engine is placed on a dynamometer to determine the frequency range of the engine noise. This is often referred to as determining the engine "signature". In addition to engine dynamometer testing, the vehicle itself may be run on a chassis dynamometer. Conducting a chassis dynamometer test not only helps determine the engine signature, but also allows a variety of other vehicle noises to be measured. During the chassis dynamometer test, the vehicle can be run in a mode designed to generate high engine noise—e.g., in first gear only—or it may be run in a mode so that other vehicle noises predominate. Throughout the tests, the noise reaching the interior of the vehicle is measured. Next, road tests may be performed to provide information on road noise, wind noise, and the frequencies of other noises external to the vehicle. Other tests can be performed, tailored to the needs of particular vehicles.

Once the target frequency range is determined for a particular vehicle, a cover material is provided to cover the vehicle seats, this is represented in block 14. Typically, the choice will be leather or other non-cloth material, such as vinyl. Cloth seat covers often have inherently good sound absorbing qualities, and so they typically do not need to be processed in accordance with the present invention. However, some cloth seat covers are tightly woven or are made from treated fabric, in which case they are candidates for the present process.

The next step is to select an optimum arrangement and size of perforations for the cover material, this is represented in block 16. The optimization of these parameters requires knowledge of the relationships between perforation size, percent open area, and frequency range of absorbed sound. Some of these relationships are illustrated graphically in FIGS. 4 and 5 and are discussed in greater detail below. Once the optimum perforation size and arrangement are chosen, the perforations are formed in the cover material. Finally, the perforated cover material is used to cover the seats. These last two steps are represented in FIG. 1 in blocks 18 and 20, respectively.

Figure 2:
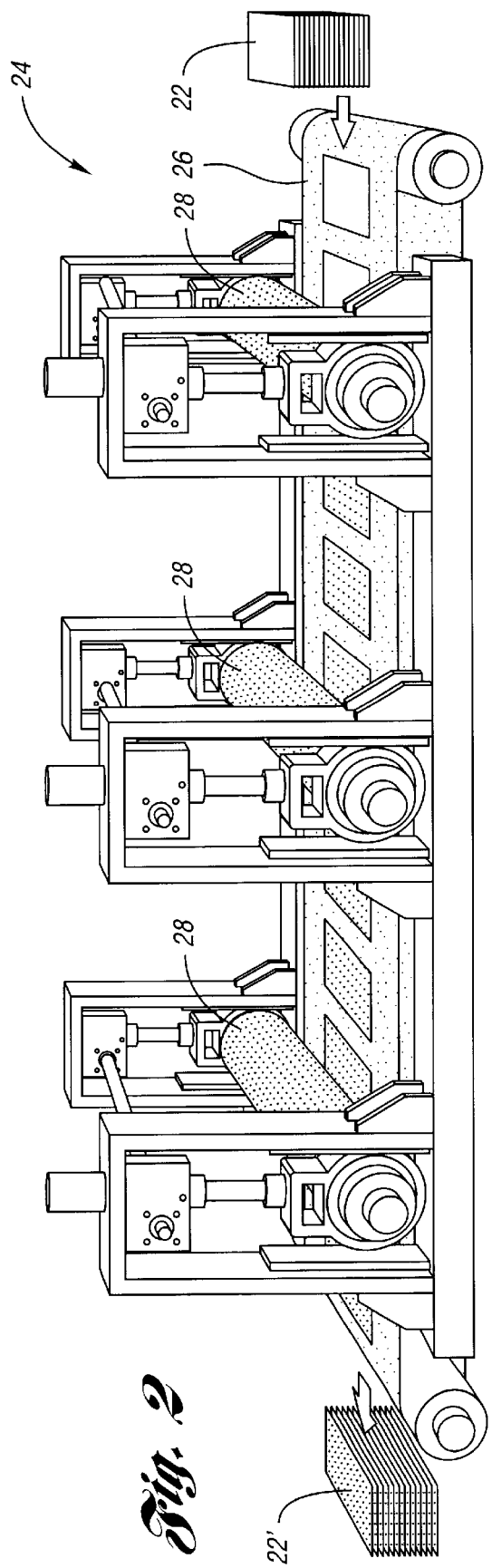
FIG. 2 is a schematic illustration of seat cover pieces being processed in a perforating machine.
Figure 3:
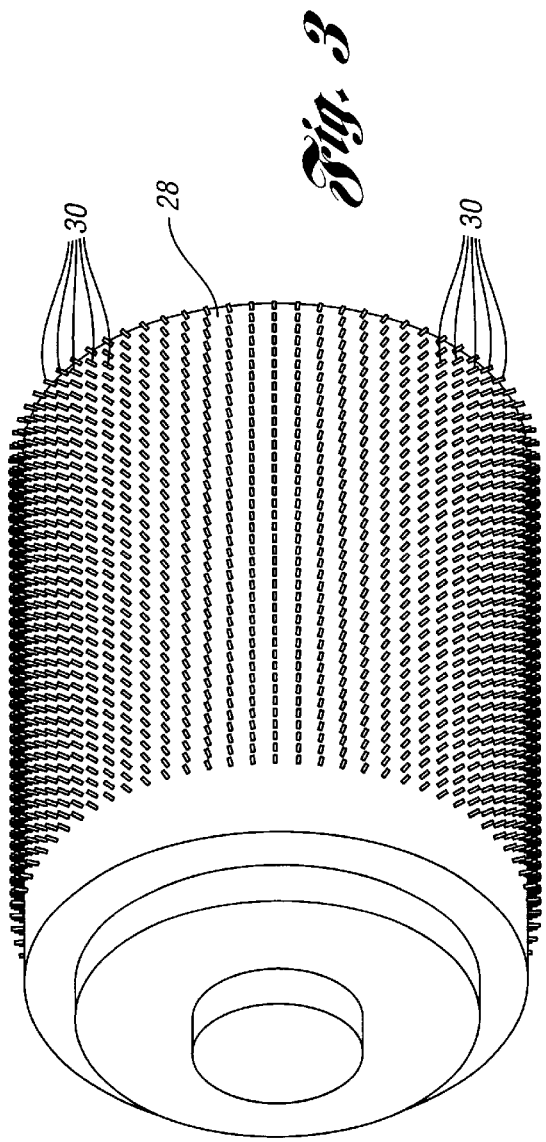
FIG. 3 is a schematic illustration of a portion of one of the spiked rollers used in the perforating machine.

Turning to FIGS. 2 and 3, the process of forming the perforations in the seat cover material is illustrated. Once the perforation size and arrangement are chosen, pieces of seat cover material 22 are fed into a perforating machine 24 on a belt 26. The belt 26 feeds the pieces of material 22 into the interior of the perforating machine 24, where they are perforated by spiked rollers 28. A close-up of one of the spiked rollers 28 is shown in FIG. 3. Thousands of spikes 30 protrude from the surface of the rollers 28. Typically the diameter of the spikes 30 is slightly less than the optimized diameter of the perforations. This is necessary because of the rotating motion of the rollers 28. As the pieces of material 22 are grabbed by the rollers 28, they are pulled along as the perforations are being formed. Hence the shape of the perforations, often too small to see with the naked eye, is slightly elliptical. As seen in FIG. 2, perforated pieces of seat cover material 22' exit the perforating machine 24, and are ready to be assembled to cover the vehicle seats.

Variation in perforation size and density can be accomplished by a number of methods. The rollers 28 can be removed from the perforation machine 24 and replaced with new rollers having a different quantity of spikes and/or spikes of different diameters. Another method to vary the number of perforations is to run a single piece of material such as 22 through the perforation machine 24 multiple times. This procedure necessarily increases the number of perforations, as not all of the perforations created on the first pass will align with the spikes 30 on the subsequent passes. The perforating machine 24 is used to generate perforations with small diameters; if larger perforations are desired, a more conventional stamping method can be employed.

Figure 4:
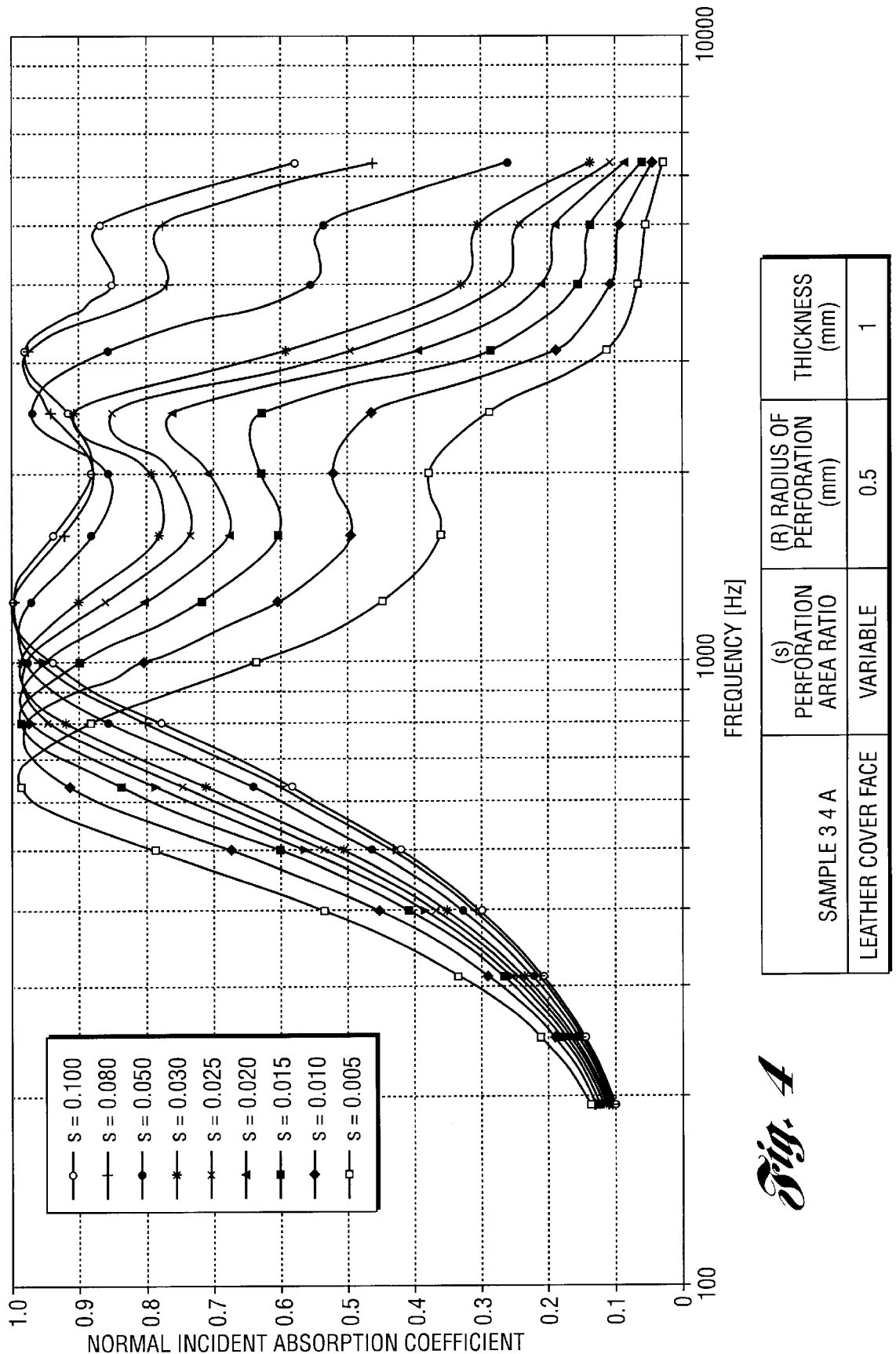
FIG. 4 is a line graph illustrating the relationship between frequency range and absorption coefficient for various percent open areas.

As previously noted, optimizing the perforation size and arrangement is only possible with knowledge of the relationships between perforation size, percent open area, and frequency range of absorbed sound. Testing was performed over a range of percent open areas, to develop data for use in predicting future optimization patterns. FIG. 4 shows predictions based on some of that testing. For a constant thickness of leather cover material (1 mm), and a constant radius of perforation (0.5 mm), the perforation area ratio (s) is allowed to vary. The perforation area ratio (s) is a measure of the surface area covered with perforations, divided by the total surface area of the piece of cover material. Although FIG. 4 gives values of (s) ranging from 0.005–0.100, in practice, preferred values of (s) will range from 0.0005–0.100. It is expected however, that some applications may require perforation area ratios outside this range.

An examination of the graph shown in FIG. 4 reveals important trends. As the perforation area ratio (s) increases, the range of frequencies with a high normal incident absorption coefficient (hereinafter referred to as "absorption coefficient") increases. This is a result of the large perforated area allowing greater penetration of the noise into the seats. Also seen in FIG. 4 is a shift in the peak absorption coefficient. Specifically, higher perforation area ratios (s) have their highest absorption coefficient at a higher frequency. This does lead to some degradation in low frequency noise reduction capability; however, the degradation is minimal, and the increase in frequency range is a benefit that will often outweigh this minor loss. In general then, a larger number of smaller perforations is desired; however, in a specific tuning application it may be desirable to move the peak absorption coefficient back toward lower frequencies. This would necessitate increasing the perforation size and/or decreasing the perforation area ratio (s).

Figure 5:
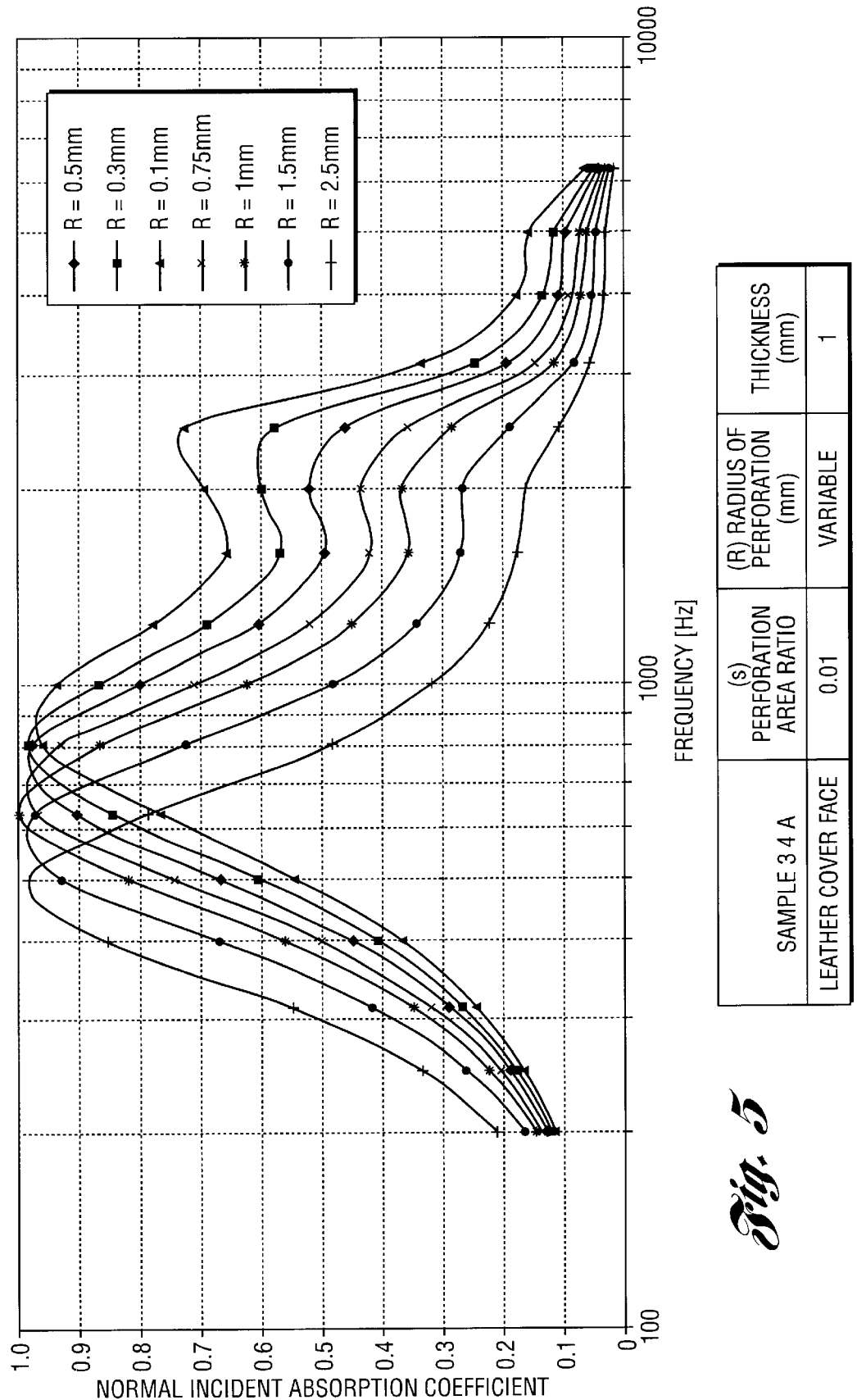
FIG. 5 is a line graph illustrating the relationship between frequency range and absorption coefficient for perforations of various radii.

The graph shown in FIG. 5 illustrates the relationship between frequencies and absorption coefficient when the perforation area ratio (s) is held constant (0.01), but the radius (R) of the holes is allowed to vary (0.1–2.5 mm). An examination of this graph reveals that smaller perforation radii lead to a broader range of frequencies having a high absorption coefficient. As in the case of increasing the perforation area ratio (s), the added benefit of the smaller perforation radius (R) comes at the slight cost of losing some absorption at low frequencies. Again, the benefit of reducing the perforation radius (R)—i.e., a marked increase in frequency range—often outweighs the degradation of low frequency absorption. It is worth noting that some tuning applications may require optimizing around lower frequencies at a cost of giving up absorbed frequency bandwidth.

FIGS. 4 and 5 graphically illustrate results of simulations based on materials with relatively large perforations. Perforations of these sizes are called "mini" perforations, which is in contrast to "micro" perforations which can be significantly smaller. There is no clear line of demarcation between micro and mini perforations. Rather, there is a range of perforation radii which depict a transition from a micro to a mini perforation. This range of radii is 0.025 mm to 0.1 mm. The significant characteristic of micro perforations is that they are too small to see with the naked eye, yet they still facilitate sound absorption.

Although the graphs shown in FIGS. 4 and 5 depict results of simulations based on mini perforations, it is expected that similar results will be obtained with materials having micro perforations. Specifically, it is expected that the relationships between perforation area ratio (s), perforation radius (R), and absorbed frequency range will essentially be the same, at least until the perforations become too small to be effective. This is important in that visible perforations, although effective facilitators of noise absorption, detract from the aesthetics of the vehicle interior. Using micro perforations eliminates this problem.

Figure 6:
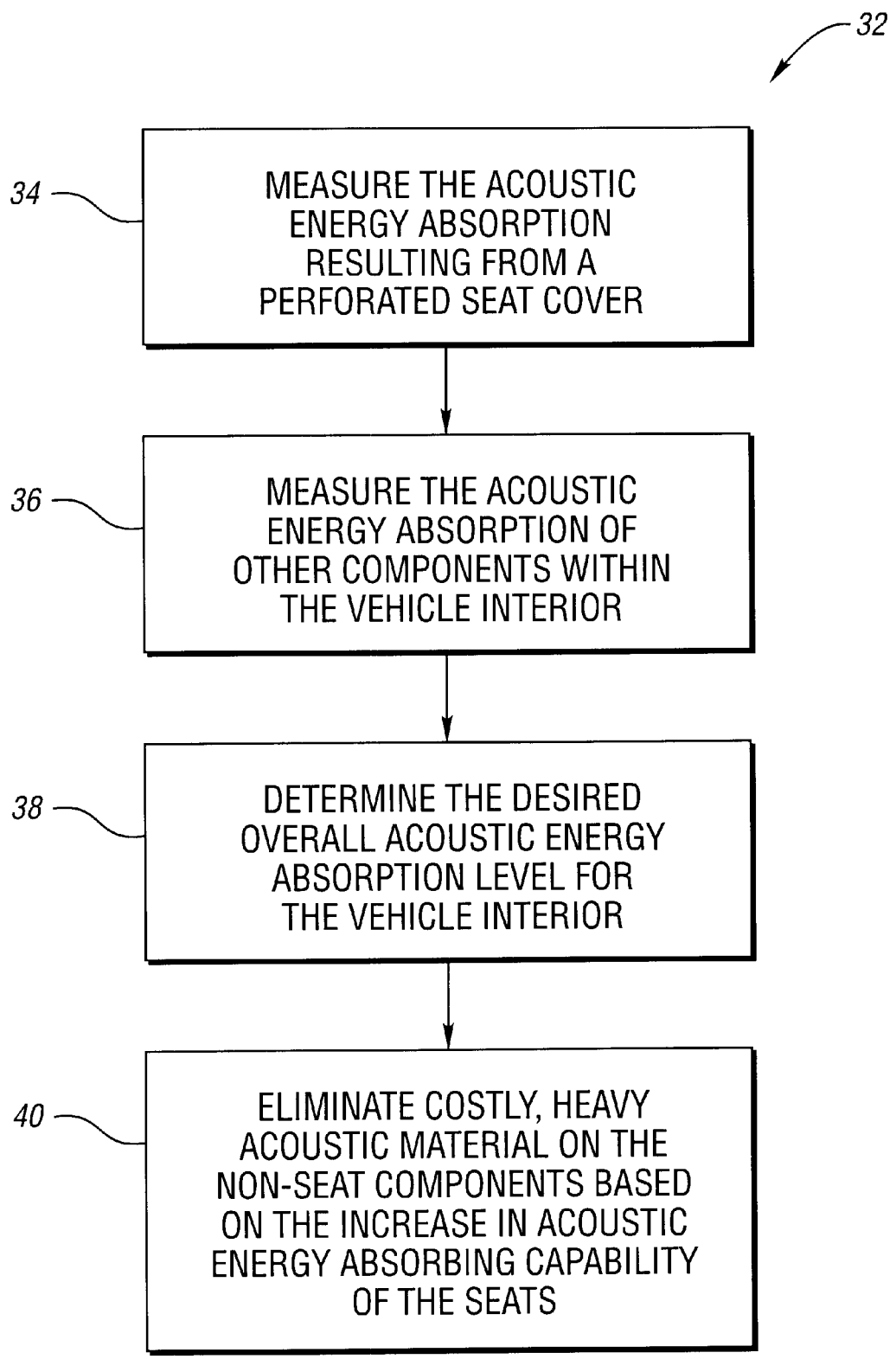
FIG. 6 is a flow chart illustrating the steps in accordance with an alternative embodiment of the present invention.

Finally, an alternative embodiment of the present invention is shown in the flow chart in FIG. 6. The process 32 includes four steps, and turns the focus from optimizing only the sound absorbing capability of the vehicle seat, to optimizing the sound absorbing capability of the entire vehicle interior, while at the same time reducing costs. Specifically, the first step, represented in block 34, requires the measurement of the acoustic energy absorption facilitated by the perforations in the seat cover. This step is followed by performing a similar analysis on other components within the vehicle interior—i.e., determining the acoustic energy absorption for each of these components. This step is represented by block 36. Typically, these components will include such items as the vehicle headliner, the floor covering, and energy absorbing trim components. Any component that is designed to absorb acoustic energy is a candidate for this analysis.

The next step, represented in block 38, is to determine the overall acoustic energy absorption level (or signature) for the vehicle interior. Because the perforated seat cover facilitates an increase in the overall acoustic energy absorption level of the vehicle interior, the designer can eliminate costly acoustic material from other interior components, while still maintaining the desired overall noise absorption level. This last step is represented in block 40. In addition, the acoustical material used in interior components is often heavy, so its elimination has the added benefit of overall weight reduction in addition to the cost savings.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of optimizing the acoustic energy absorption level of a vehicle interior, comprising:
    measuring the acoustic energy absorption of a plurality of vehicle seats with perforated seat covers;
    measuring the acoustic energy absorption of at least one other vehicle interior component;
    determining the desired overall acoustic energy absorption for the vehicle interior; and
    modifying the other vehicle interior component to eliminate unnecessary acoustic energy absorption material.

2. A method of optimizing the acoustic energy absorption performance of a vehicle interior, comprising:
    providing perforated seat covers on seats in a vehicle;
    measuring the acoustic energy absorption of said seats in the vehicle;

determining the desired overall acoustic energy absorption performance for the vehicle interior; and selecting another vehicle interior component in a manner to decrease costs by eliminating unnecessary acoustic energy absorption characteristics from said other vehicle interior component as a result of improved overall energy absorption performance due to the perforated seat covers, thereby achieving said desired overall acoustic energy absorption performance as a low cost.

* * * * *